(12) United States Patent
Dochez (10) Patent No.: US 9,639,402 B2
(45) Date of Patent: May 2, 2017

(54) SYSTEMS AND METHODS FOR AUTOMATIC HARDWARE PROVISIONING BASED ON APPLICATION CHARACTERISTICS

(75) Inventor: Jerome Dochez, Palo Alto, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 272 days.

(21) Appl. No.: 13/204,494

(22) Filed: Aug. 5, 2011

(65) Prior Publication Data

US 2013/0036208 A1    Feb. 7, 2013

(51) Int. Cl.
*G06F 15/177* (2006.01)
*G06F 9/50* (2006.01)

(52) U.S. Cl.
CPC .......... *G06F 9/5077* (2013.01); *Y02B 60/142* (2013.01); *Y02B 60/167* (2013.01)

(58) Field of Classification Search
CPC .... G06F 9/5077; Y02B 60/167; Y02B 60/142
USPC ............................ 709/220–206; 718/100–108
See application file for complete search history.

(56) References Cited

U.S. PATENT DOCUMENTS

| | | | |
|---|---|---|---|
| 7,536,595 B1 * | 5/2009 | Hiltunen et al. | 714/26 |
| 7,743,373 B2 * | 6/2010 | Avram et al. | 717/174 |
| 2006/0031444 A1 | 2/2006 | Drew et al. | |
| 2006/0253849 A1 | 11/2006 | Avram | |
| 2008/0163194 A1 * | 7/2008 | Dias | G06F 9/5077 717/174 |
| 2008/0244600 A1 * | 10/2008 | Wong et al. | 718/104 |

(Continued)

FOREIGN PATENT DOCUMENTS

| | | |
|---|---|---|
| CN | 102103518 | 6/2011 |
| JP | 2007-219964 | 8/2007 |
| JP | 2009-193205 | 8/2009 |

OTHER PUBLICATIONS

International Search Report dated Oct. 29, 2012 for Application No. PCT/US2012/048643, 10 pages.

(Continued)

*Primary Examiner* — Chris Parry
*Assistant Examiner* — Weiwei Stiltner
(74) *Attorney, Agent, or Firm* — Tucker Ellis LLP (57) ABSTRACT

Systems and methods are provided for automatically provisioning resources based on application characteristics. In accordance with an embodiment, a system can include a computer, including a computer readable medium and processor, and a template engine, executing on the computer. The template engine is configured to receive applications and associated metadata. The system can also include a virtualized environment, and a plurality of templates, each defining a different resource available within the virtualized environment. When the template engine receives an application and associated metadata, the template engine determines resource requirements for the application based on the associated metadata, compares the resource requirements with the plurality of templates, identifies appropriate templates for the resource requirements, and provisions resources in the virtualized environment using the appropriate templates. Hardware resources can then be allocated dynamically according to the needs of the virtualized environment.

20 Claims, 5 Drawing Sheets

(56) References Cited

U.S. PATENT DOCUMENTS

| | | | |
|---|---|---|---|
| 2009/0138883 A1 | 5/2009 | McLean | |
| 2009/0158384 A1 | 6/2009 | Kanade | |
| 2009/0313620 A1 | 12/2009 | Sedukhin | |
| 2010/0125844 A1 | 5/2010 | Mousseau et al. | |
| 2010/0175064 A1* | 7/2010 | Brahmaroutu | 718/1 |
| 2010/0180275 A1* | 7/2010 | Neogi et al. | 718/1 |
| 2010/0287598 A1* | 11/2010 | Korkishko | G06F 21/53 726/1 |
| 2010/0325624 A1* | 12/2010 | Bartolo | G06F 8/61 717/176 |
| 2011/0202925 A1* | 8/2011 | Banerjee et al. | 718/104 |
| 2011/0295999 A1* | 12/2011 | Ferris et al. | 709/224 |
| 2011/0320606 A1* | 12/2011 | Madduri et al. | 709/226 |
| 2011/0321033 A1* | 12/2011 | Kelkar | G06F 9/44505 717/174 |
| 2012/0011515 A1* | 1/2012 | Jolfaei | G06Q 30/0283 718/103 |
| 2012/0089726 A1* | 4/2012 | Doddavula | H04L 67/34 709/224 |
| 2012/0151174 A1* | 6/2012 | Matsunaga et al. | 711/171 |
| 2012/0246317 A1* | 9/2012 | Eriksson et al. | 709/226 |

OTHER PUBLICATIONS

State Intellectual Property Office of the People's Republic of China, Notification of the First Office Action, Search Report Dated Jun. 3, 2016 for Chinese Patent Application No. 201280036478.9, 9 pages.

* cited by examiner

SYSTEMS AND METHODS FOR AUTOMATIC HARDWARE PROVISIONING BASED ON APPLICATION CHARACTERISTICS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to deployment of applications in an application server environment, and is particularly related to systems and methods for automatic hardware provisioning based on application characteristics.

BACKGROUND

Typically, applications, such as Java applications, are deployed by first securing physical resources (such as gathering servers and group them into a cluster), and then performing deployment of the application to these physical resources. The hardware definition (i.e., the configuration of the physical resources) is static. As such, this technique does not allow for much flexibility when, e.g., the deployed applications require more computing power or less computing power. Such static definitions lead to poor hardware utilization optimization and added cost in terms of machines amortization and electric power consumption. Additionally, deployment is typically application server dependent. This means that switching from one application server (such as the Oracle Glassfish Server), to a different application server (such as Oracle WebLogic server), typically requires a new configuration, followed by a redeployment. These are the general areas that embodiments of the invention are intended to address.

SUMMARY

As described herein, systems and methods are provided for automatically provisioning resources based on application characteristics. In accordance with an embodiment, a system can include a computer, including a computer readable medium and processor, and a template engine, executing on the computer. The template engine is configured to receive applications and associated metadata. The system can also include a virtualized environment, and a plurality of templates, each defining a different resource available within the virtualized environment. When the template engine receives an application and associated metadata, the template engine determines resource requirements for the application based on the associated metadata, compares the resource requirements with the plurality of templates, identifies appropriate templates for the resource requirements, and provisions resources in the virtualized environment using the appropriate templates. Hardware resources can then be allocated dynamically according to the needs of the virtualized environment. Such automatic provisioning eases deployment and undeployment of applications for users by simplifying the processes. Additionally, it allows for the allocated resources for a given application to by dynamically adjusted based on performance, which can be useful in any number of implementations, such as in cloud computing.

DETAILED DESCRIPTION

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

As described herein, systems and methods are provided for automatically provisioning resources based on application characteristics. In accordance with an embodiment, a system can include a computer, including a computer readable medium and processor, and a template engine, executing on the computer. The template engine is configured to receive applications and associated metadata. The system can also include a virtualized environment, and a plurality of templates, each defining a different resource available within the virtualized environment. When the template engine receives an application and associated metadata, the template engine determines resource requirements for the application based on the associated metadata, compares the resource requirements with the plurality of templates, identifies appropriate templates for the resource requirements, and provisions resources in the virtualized environment using the appropriate templates. Hardware resources can then be allocated dynamically according to the needs of the virtualized environment. Such automatic provisioning eases deployment and undeployment of applications for users by simplifying the processes. Additionally, it allows for the allocated resources for a given application to by dynamically adjusted based on performance, which can be useful in any number of implementations, such as in cloud computing.

Additional advantages of such late binding include enabling the system to optimize the allocation of machines based on the application's characteristics and performance. The system can also increase or decrease the number of virtual machines used based on the application's usage statistics. Additionally, the density of applications running per server can be improved by moving/starting or stopping virtual machines. Application servers can be more easily maintained as hardware allocation is performed by the system upon application deployment. Also more efficient use of hardware can reduce hardware and power consumption costs.

Figure 1:
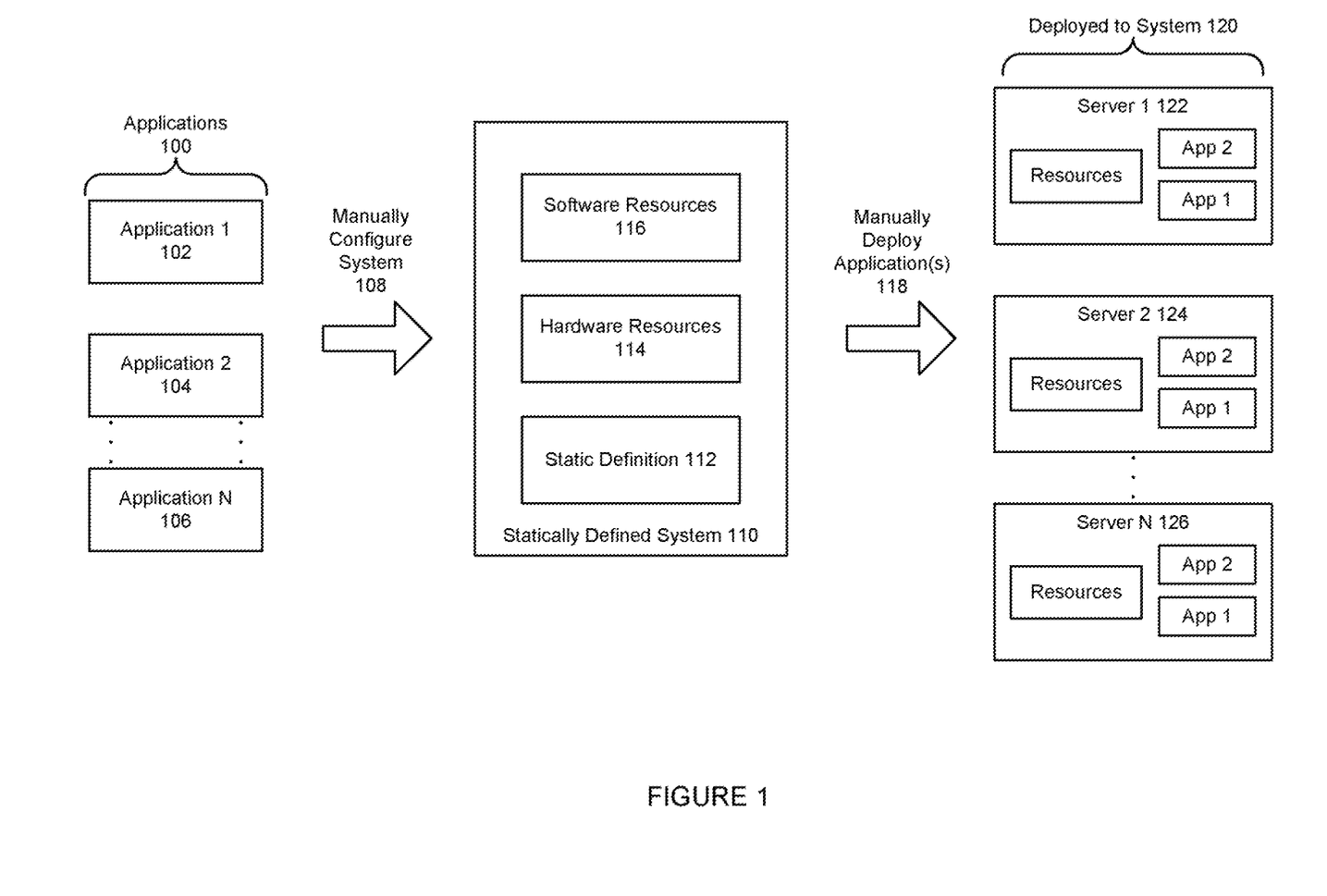
FIG. 1 shows a block diagram of a traditional deployment environment.

FIG. 1 shows a block diagram of a traditional deployment environment. Traditional systems require the hardware infrastructure (e.g., multiple machines, databases, application servers, etc.) to be manually set up and then configured before an application could be deployed. As shown in FIG. 1, a variety of applications 100 are available to be deployed. These include Application 1, 102, Application 2, 104, to Application N, 106. Before any of these applications can be deployed, an appropriate system must be manually configured 108. This statically defined system 110, will be based on a static definition 112 and include hardware resources 114 and software resources which are believed to be necessary for proper deployment and operation of the application being deployed. Once the necessary resources have been retrieved, the statically defined system can then be configured, for example into a cluster or other appropriate configuration.

Subsequently, one or more of the applications can be manually deployed 118 to the statically defined system, as shown at 120. In this example, the statically defined system has a plurality of servers (Server 1, 122, Server 2, 124, to server N, 126), each with its own resources, and to which two of the applications have been deployed. However, such a system suffers from being static. For example, if resources have been misallocated to the system (either too many or too few), the application may not function correctly or efficiently. Additionally, changes to such a system typically require the applications to be undeployed and then redeployed to a newly allocated system. This can cause the application to be unavailable during this period.

In accordance with an embodiment, virtualization can be used to associate physical resources (hardware infrastructure) to a deployment of an application dynamically and automatically. Physical resources do not need to be associated with an application before deployment, instead the appropriate physical resources can be dynamically determined and allocated during deployment. Additionally, by monitoring the performance of the deployed application, the physical resources which were initially allocated can be dynamically updated without requiring the application to be redeployed.

In accordance with an embodiment, applications can be deployed on one or more application server running in virtual machines, within a virtualization environment. Hardware (physical) resources can be provided based on characteristics of the application, instead of mapping applications to existing hardware resources. Thus, hardware allocation becomes a by-product of application deployment which provides the system with greater flexibility to customize environment to which the application is deployed (e.g., a cluster) based on the performance of the application.

Figure 2:
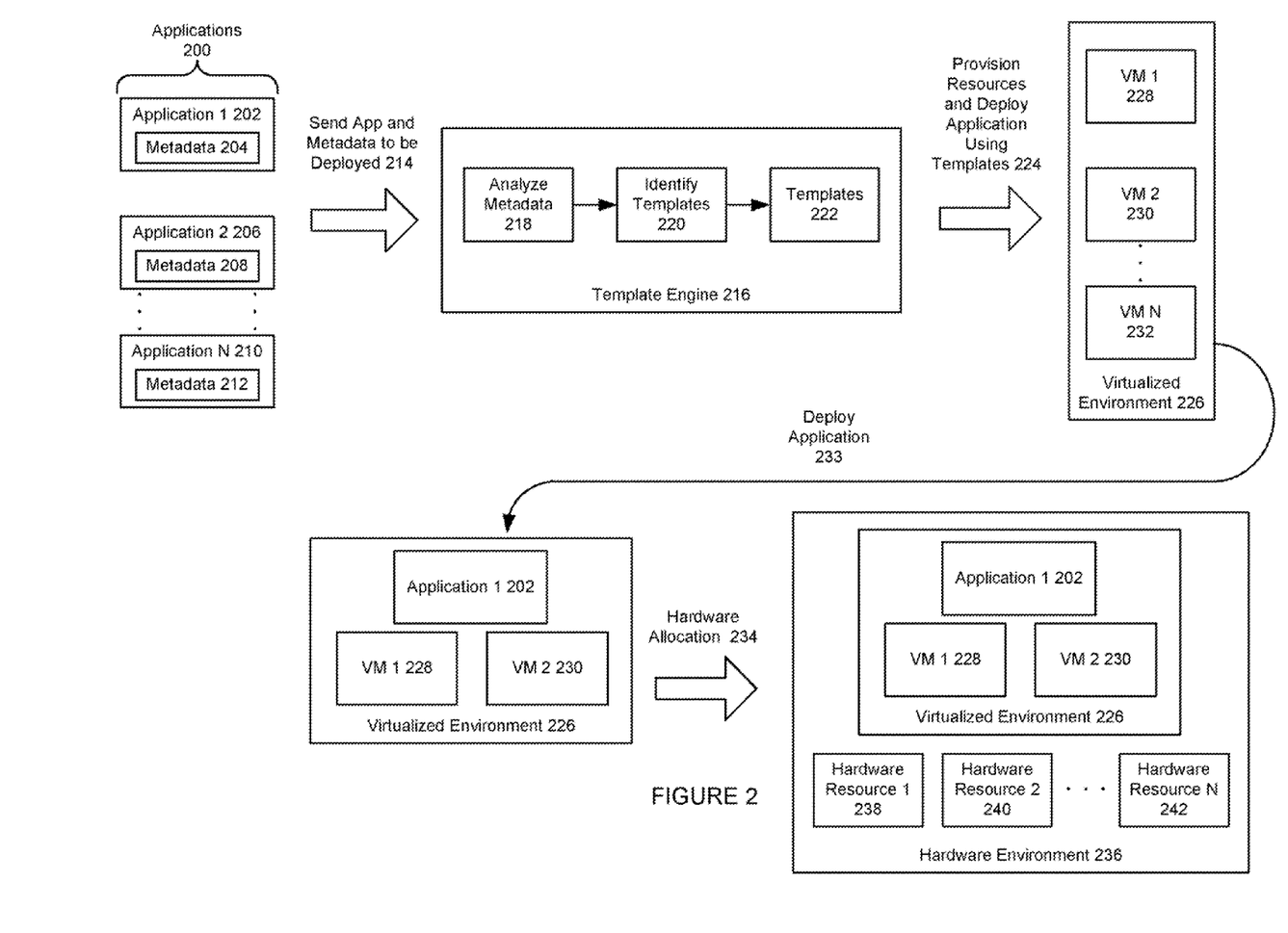
FIG. 2 shows a block diagram of a system for automatic hardware provisioning, in accordance with an embodiment.

FIG. 2 shows a block diagram of a system for automatic hardware provisioning, in accordance with an embodiment. As shown in FIG. 2, a plurality of applications 200 are available to be deployed. In this example, deployment of the application can occur first, without a manual system configuration. Each application (Application 1, 202, Application 2, 206, to Application N, 210) includes metadata (204, 208, 212) specific to that application. The metadata defines the system resources which should be allocated for that application when it is deployed. At 214, an application and its metadata is sent to be deployed. A template engine 216, receives the application and metadata. The template engine can analyze the metadata 218 and identify what resources are requested by the application. For example, these resources could include a number of application servers, databases or message services. The template engine includes a plurality of templates, each associated with a different resource. The template engine can identify the appropriate templates 220 based on its analysis of the metadata, from among the templates 222 available to the template engine. Using these templates, the template engine can provision the appropriate resources from a virtualized environment 226.

In accordance with an embodiment, the virtualized environment can include one or more virtual machines. As shown in FIG. 2, the virtualized environment includes a plurality of virtual machines including VM 1, 228, VM 2, 230, to VM N, 232. The application can then be deployed 233 to the virtualized hardware environment which includes the provisioned resources.

After the application has been deployed to the virtualized environment, hardware is allocated 234 based on the resource requirements of the application. The hardware can be allocated from a backend hardware environment 236 which includes a plurality of generic hardware resources (238-242) such as hardware servers, computers, databases, etc. Both the virtualized environment to which the application is deployed, and the hardware environment which hosts the virtualized environment, can be updated dynamically without having to redeploy the application.

Figure 3:
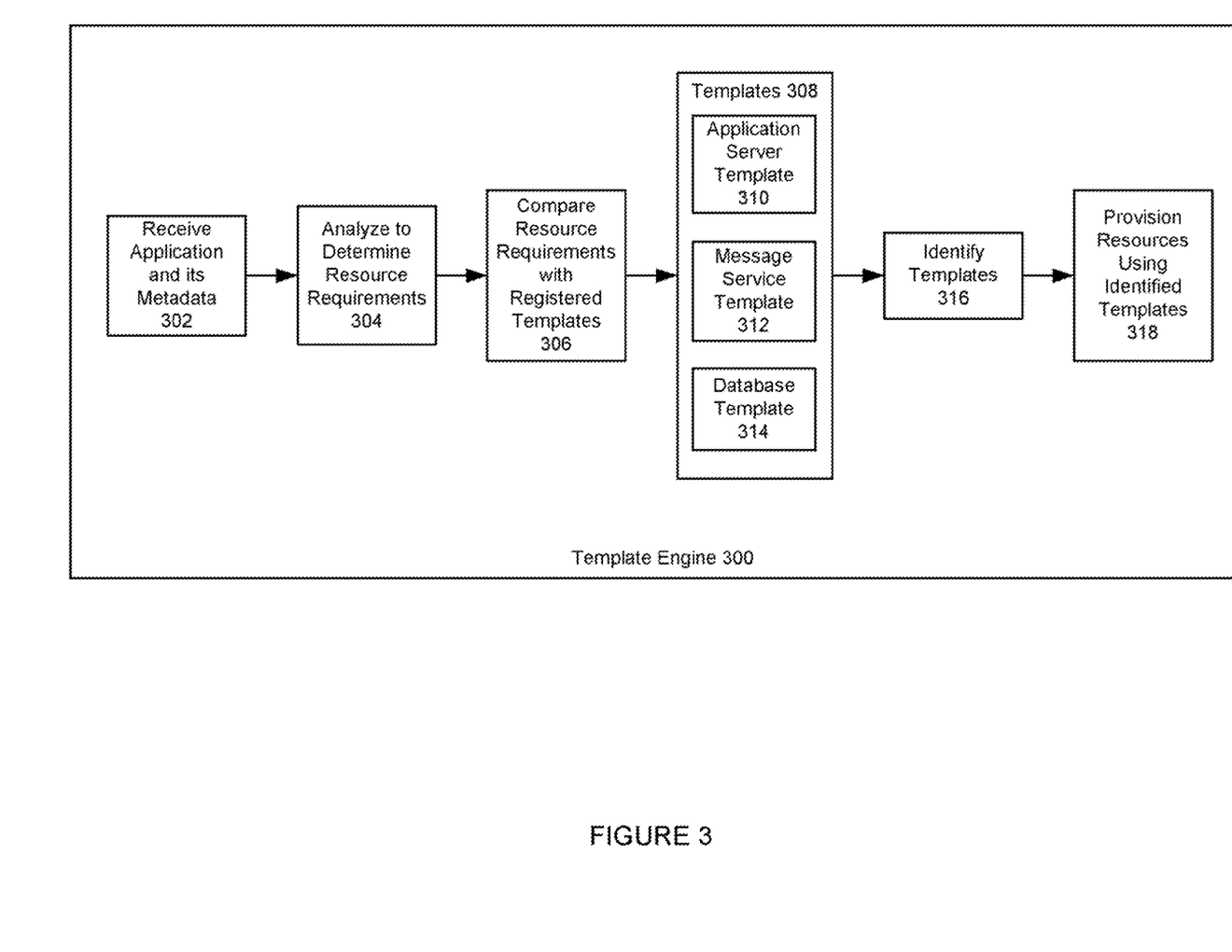
FIG. 3 shows a block diagram of a template engine, in accordance with an embodiment.

FIG. 3 shows a block diagram of a template engine, in accordance with an embodiment. In accordance with an embodiment, when a user chooses to deploy an application, the user sends the application and its metadata to a template engine 300. The template engine receives the application and metadata 302 and analyzes the metadata to determine the resource requirements of the application. If the application does not include metadata, or if the metadata does not include resource requirements, the template engine can assign a default set of resources for the application. This can be accomplished using one or more preconfigured default settings, selected by the template engine based on the type of application being deployed. Additionally, some resources can be identified implicitly, based on stored information detailing the typical resource requirements of similar types of applications.

Once the template engine has determined the resource requirements of the application, it can compare them with the templates which are registered (i.e., available) with the template engine 306. The templates 308 can includes application server templates 310, message service templates 312, database templates 314, among others. The template engine can identify the appropriate templates 316 based on the application's resource requirements and the provision the appropriate resources using the identified templates 318. When the template engine provisions the appropriate resources, it obtains address information (such as IP addresses) for all of the resources. The template engine can then formally deploy the application using the address information for the resources so that the application can immediately communicate with all of the resources.

Figure 4:
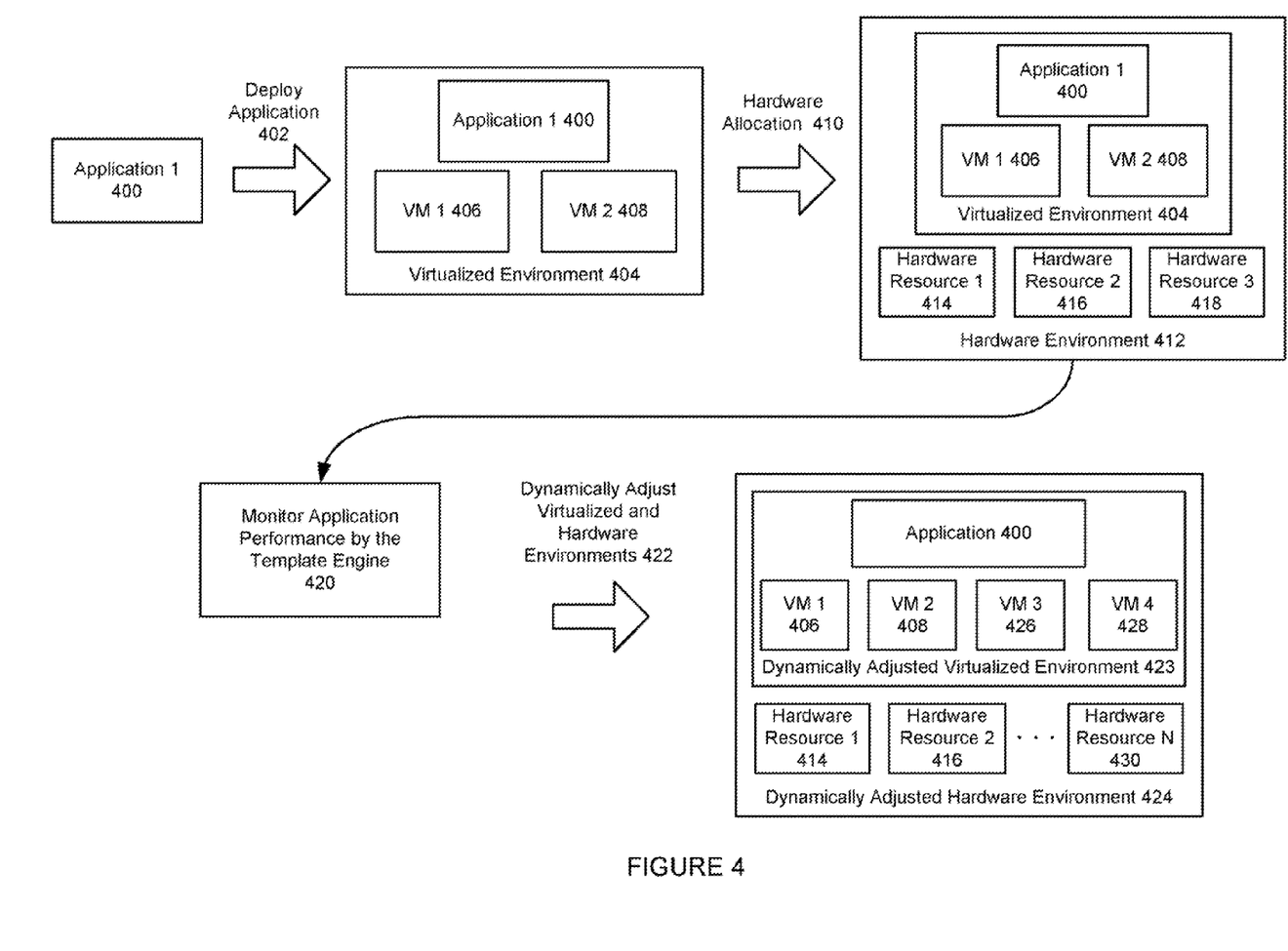
FIG. 4 shows a block diagram of a system for dynamically updating a deployment environment, in accordance with an embodiment.

FIG. 4 shows a block diagram of a system for dynamically updating a deployment environment, in accordance with an embodiment. As described above, a template engine can provision resources and deploy an application to a virtualized environment using templates. As shown in FIG. 4, Application 1 400 can be deployed 402 to a virtualized hardware environment 404. The virtualized environment 404 can include a plurality of virtual machines (such as VM 1 406 and VM 2 408).

Subsequently, hardware resources can then be allocated 410 from the hardware environment 412. By deploying the application to a virtualized environment, and allocating hardware resources through a late binding, the resources allocated for a particular application can be dynamically adjusted according to the application's observed requirements, and further adjusted as the performance of the application requires.

As shown in FIG. 4, Application 1 400 has been deployed to the virtualized hardware environment, which includes two virtual machines VM 1 and VM2, hosted on hardware resources 1-3 (414-418) in hardware environment 412. The template engine can monitor the performance of the application 420 in the virtualized and hardware environments as initially configured. If the application needs to be reconfigured, the template engine can identify what resources are currently allocated and compare them to what resources are newly requested. The template engine can then dynamically adjust the resources allocated in the virtualized and hardware environments 422. As shown in FIG. 4, a dynamically adjusted virtualized environment 423 is hosted by a dynamically adjusted hardware environment 424. If it is determined that the application is not performing correctly in the virtual and/or hardware environments as currently allocated, then additional resources can be added to each environment. For example, VM 3 426 and VM 4 428 can be added to the virtualized environment; and a plurality of additional hardware resources to Hardware Resource N 430 can be added to the hardware environment. However, if too many resources had been initially allocated, and the application was not utilizing them all, the template engine could dynamically reduce the virtualized and hardware resources allocated for the application. Similarly, if an application is no longer to be used it can be undeployed. This will delete the virtualized environment, such that the virtual machines are removed and it's as though the application had never been deployed.

Figure 5:
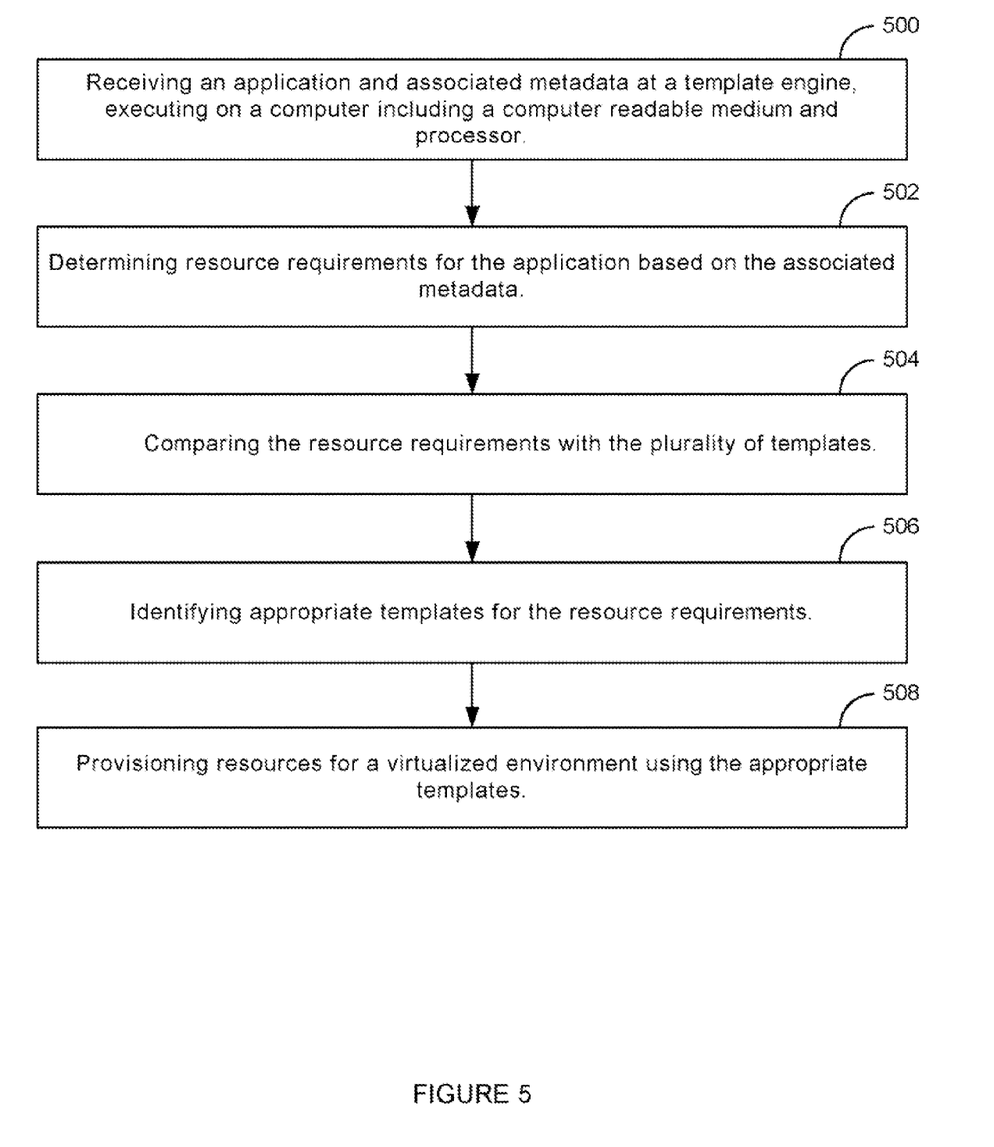
FIG. 5 shows a method for automatically provisioning hardware resources based on application characteristics, in accordance with an embodiment.

FIG. 5 shows a method for automatically provisioning hardware resources based on application characteristics, in accordance with an embodiment. At step 500, an application and its associated metadata is received at a template engine. At step 502, the resource requirements of the application are determined, based on the metadata. At step 504, the resource requirements are compared with a plurality of templates. At step 506, appropriate templates for the resource requirements are identified. At step 508, resources are provisioned in the virtualized environment for the resources using the templates.

The method shown in FIG. 5 can further include hosting the virtualized environment by a hardware environment which includes a plurality of generic hardware resources. It can additionally include monitoring performance of the application; and dynamically adjusting the resources in the virtualized environment based on the performance of the application. Additionally, the generic hardware resources in the hardware environment can be dynamically adjusted based on the performance of the application. Also, the application can be undeployed by deleting the virtualized environment.

The present invention can be conveniently implemented using one or more conventional general purpose or specialized digital computer, computing device, machine, or microprocessor, including one or more processors, memory and/or non-transitory computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a computer readable storage medium (media) having instructions stored thereon/in which can be used to program a computer to perform any of the processes of the present invention. The computer readable storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for automatically provisioning resources based on application characteristics, comprising:
   a computer, including a microprocessor;
   a virtualized environment with one or more virtual machines therein, wherein the one or more virtual machines provide a plurality of software resources that include at least one or more application servers, one or more databases, and one or more message services;
   a template engine, executing on the computer, wherein the template engine includes
      a plurality of software templates registered therewith, wherein each software template defines a single one of the plurality of software resources provided in the virtualized environment, and
      a plurality of preconfigured settings, wherein each preconfigured setting specifies a set of software resources required for a particular type of application;
   wherein when the template engine receives an application for deployment, the template engine operates to
      determine a type of the application for deployment,
      identify, using a preconfigured setting associated with the determined application type, a default set of software resources for the application for deployment,
      identify one or more additional software resources for the application for deployment based on a preconfigured setting for a different application that shares a set of characteristics with the application for deployment,
      identify a plurality of software templates, based on the default set of software resources and the one or more additional software resources identified for the application for deployment,
      provision, in the virtualized environment, the identified software resources for the application for deployment using the plurality of identified templates for late binding to hardware resources by obtaining address information of the software resources, and deploys the application to the provisioned software resources using the address information, wherein the provisioned software resources are dynamically adjusted, including allocating additional software resources to the application or reducing the provisioned software resources based on performance of the application after the application is deployed.

2. The system of claim 1, further comprising:
a hardware environment which includes a plurality of generic hardware resources configured to host the virtualized environment.

3. The system of claim 1, wherein the template engine is further configured to monitor the performance of the application.

4. The system of claim 2, wherein the template engine is further configured to dynamically adjust the generic hardware resources in the hardware environment based on the performance of the application.

5. The system of claim 1 wherein the template engine is further configured to undeploy the application by deleting the virtualized environment.

6. The system of claim 1, wherein the address information include an IP address of each of the required software resources for the application.

7. The system of claim 1, wherein the template engine further operates to receive metadata associated with the application for deployment, wherein the associated metadata fails to specify software resources required for the application to be deployed and operational.

8. The system of 7, wherein the plurality of preconfigured settings are stored in the template engine.

9. A method for automatically provisioning resources based on application characteristics, comprising:
providing a virtualized environment with one or more virtual machines therein, wherein the one or more virtual machines provide a plurality of software resources that include at least one or more application servers, one or more databases, and one or more message services;
providing a template engine that includes
a plurality of software templates registered therewith, wherein each software template defines a single one of the plurality of software resources provided in the virtualized environment, and
a plurality of preconfigured settings, wherein each preconfigured setting specifies one or more software resources required for a particular type of application;
receiving an application for deployment at the template engine, wherein the template engine operates to
determine a type of the application for deployment,
identify, using a preconfigured setting associated with the determined application type, a default set of software resources for the application for deployment,
identify one or more additional software resources for the application for deployment based on a preconfigured setting for a different application that shares a set of characteristics with the application for deployment;
identifying a plurality of software templates for the application, based on the default set of software resources and the one or more additional software resources;

provisioning, in the virtualized environment, the software resources using the plurality of identified templates for late binding to hardware resources by obtaining address information of the software resources; and
deploying the application to the provisioned software resources using the address information;
wherein the provisioned software sources are dynamically adjusted, including allocating additional software resources to the application or reducing the provisioned software resources based on performance of the application after the application is deployed.

10. The method of claim 9, further comprising:
hosting the virtualized environment by a hardware environment which includes a plurality of generic hardware resources.

11. The method of claim 9, further comprising:
monitoring the performance of the application.

12. The method of claim 10, further comprising:
dynamically adjusting the generic hardware resources in the hardware environment based on the performance of the application.

13. The method of claim 9 further comprising:
undeploying the application by deleting the virtualized environment.

14. The method of claim 9, wherein the address information include an IP address of each of the required software resources for the application.

15. A non-transitory computer readable storage medium, including instructions stored thereon which, when executed by a computer, cause the computer to perform the steps comprising:
configuring a virtualized environment with one or more virtual machines therein, wherein the one or more virtual machines provide a plurality of software resources that include at least one or more application servers, one or more databases, and one or more message services;
providing a template engine that includes
a plurality of software templates registered therewith, wherein each software template defines a single one of the plurality of software resources provided in the virtualized environment, and
a plurality of preconfigured settings, wherein each preconfigured setting specifies one or more software resources required for a particular type of application;
receiving an application for deployment at the template engine, wherein the template engine operates to
determine a type of the application for deployment,
identify, using a preconfigured setting associated with the determined application type, a default set of software resources for the application for deployment,
identify one or more additional software resources for the application for deployment based on a preconfigured setting for a different application that shares a set of characteristics with the application for deployment;
identifying a plurality of software templates for the application, based on the default set of software resources and the one or more additional software;
provisioning, in the virtualized environment, the software resources using the plurality of identified templates for late binding to hardware resources by obtaining address information of the software resources; and
deploying the application to the provisioned software resources using the address information;

wherein the provisioned software sources are dynamically adjusted, including allocating additional software resources to the application or reducing the provisioned software resources based on performance of the application after the application is deployed.

16. The non-transitory computer readable storage medium of claim 15, further comprising:
hosting the virtualized environment by a hardware environment which includes a plurality of generic hardware resources.

17. The non-transitory computer readable storage medium of claim 16, further comprising:
monitoring the performance of the application.

18. The non-transitory computer readable storage medium of claim 16, further comprising:
dynamically adjusting the generic hardware resources in the hardware environment based on the performance of the application.

19. The non-transitory computer readable storage medium of claim 15 further comprising:
undeploying the application by deleting the virtualized environment.

20. The non-transitory computer readable storage medium of claim 15, wherein the address information include an IP address of each of the required software resources for the application.

* * * * *

UNITED STATES PATENT AND TRADEMARK OFFICE
CERTIFICATE OF CORRECTION

PATENT NO.         : 9,639,402 B2
APPLICATION NO.    : 13/204494
DATED              : May 2, 2017
INVENTOR(S)        : Dochez It is certified that error appears in the above-identified patent and that said Letters Patent is hereby corrected as shown below:

In Column 5, Line 14, delete "VM2," and insert -- VM 2, --, therefor.

In Column 7, Line 34, in Claim 8, after "system of" insert -- claim --.

In Column 8, Line 61, in Claim 15, delete "software;" and insert -- software resources; --, therefor.

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*